G. MARTIN.
PRESSURE OIL CUP.
APPLICATION FILED MAR. 6, 1919.

1,309,442.

Patented July 8, 1919.

INVENTOR
George Martin
BY
A. M. Wooster
ATTORNEY

UNITED STATES PATENT OFFICE.

GEORGE MARTIN, OF ANSONIA, CONNECTICUT.

PRESSURE OIL-CUP.

1,309,442.  Specification of Letters Patent.  Patented July 8, 1919.

Application filed March 6, 1919. Serial No. 280,953.

*To all whom it may concern:*

Be it known that I, GEORGE MARTIN, a citizen of the United States, residing at 25 Holbrook street, Ansonia, county of New Haven, State of Connecticut, have invented an Improvement in Pressure Oil-Cups, of which the following is a specification.

This invention relates to oil cups of the pressure type and has for its objects to provide a structure that shall be relatively inexpensive to produce, easy to fill and to operate, and thoroughly effective and satisfactory in use.

With these and other objects in view I have devised the novel oil cup which will be hereinafter described and the novel features of which will be defined in the claims hereunto appended.

Figure 1:
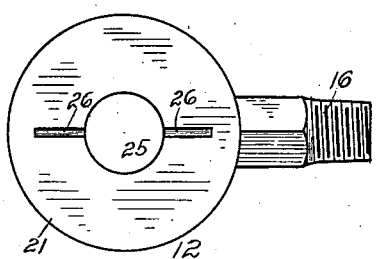
Figure 2:
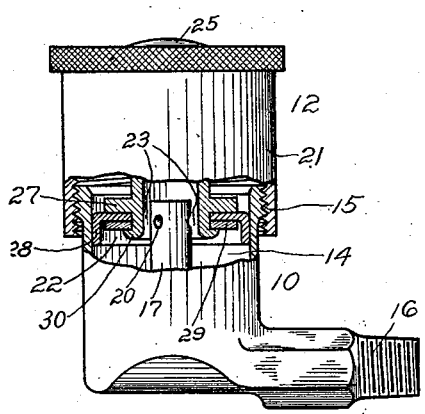
Figure 2:
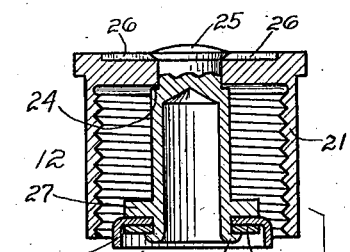
Figure 3:
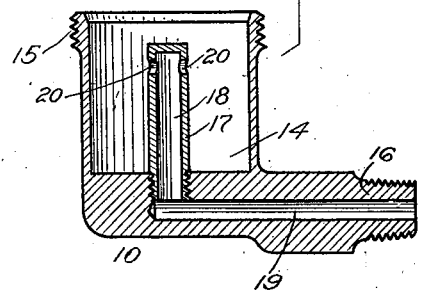

In the accompanying drawing forming a part of this specification,

Figure 1 is a plan view of my novel oil cup;

Fig. 2 an elevation partly broken away, and Fig. 3 is a vertical sectional view showing the cap and body members diassembled.

10 denotes the body member as a whole and 12 the cap member as a whole. The body member comprises a reservoir 14 having an external screw thread 15 at its upper end, and a threaded attaching hub 16 which in the present instance is shown as extending laterally below the reservoir. 17 denotes a stem which extends upward centrally from the bottom of the reservoir. This stem has a longitudinal bore 18 which intersects a bore 19 in the attaching hub. The upper end of the stem is closed but is provided with lateral feed openings 20.

The cap member comprises a cap 21 which is internally threaded to engage thread 15 on the body member, and a central hollow piston 22 which receives the stem. The bore of the piston is of appreciably greater diameter than the stem so as to leave an ample passage for oil, indicated by 23, surrounding the stem. The head of the cap is provided with a central opening through which the reduced upper end of the piston passes, the cap being loosely retained in place, so as to swivel freely, between a shoulder 24 and a heading 25 at the upper end of the piston. The outer face of the cap is shown as provided with grooves 26 to receive a spanner wrench for convenience in rotating the cap on the piston. Near its lower end the piston is provided with a collar 27. 28 denotes a cup shaped flexible piston washer which lies between the collar and a metal washer 29 and closely engages the wall of the reservoir. The washers are retained in place by flanging the lower end of the piston outward, as at 30, against the metallic washer.

The operation will be readily understood from Fig. 2. When the cap is turned forward on the piston the engagement of the threads on the cap and body members will carry the piston forward, the flexible piston washer acting to prevent back flow of the oil. Consequently, as the cap is turned forward, oil will be forced upward in passage 23 and through feed openings 20 into the bore of the stem and outward through the bore of the attaching hub.

Having thus described my invention, I claim:

1. An oil cup comprising a body member having an external screw thread, and a central stem having a longitudinal bore closed at its upper end and having feed openings leading into the bore, and a cap member comprising a cap having threaded engagement with the body member, and a piston on which the cap is swiveled, the piston having a longitudinal bore which receives the stem loosely leaving an oil passage surrounding the stem, so that when the cap is turned downward oil will be forced through said passage and through the feed openings into the bore of the stem.

2. In an oil cup the combination with a reservoir having an external thread and a central stem having a longitudinal bore closed at its upper end and having feed openings leading into the bore, of a cap internally threaded to engage the reservoir, and a piston on which the cap is swiveled, said piston having a bore which receives the stem leaving an oil passage surrounding the stem, and a flexible washer which engages the wall of the reservoir.

In testimony whereof I affix my signature.

GEORGE MARTIN.

Copies of this patent may be obtained for five cents each, by addressing the "Commissioner of Patents, Washington, D. C."